(12) United States Patent
Takahashi

(10) Patent No.: US 9,108,239 B2
(45) Date of Patent: Aug. 18, 2015

(54) SHEET MATERIAL HAVING CONCAVE-CONVEX SECTION, AND LAMINATED STRUCTURE AND VEHICLE PANEL USING THE SAME

(75) Inventor: Masaya Takahashi, Tokyo (JP)

(73) Assignee: SUMITOMO LIGHT METAL INDUSTRIES, LTD., Tokyo (JP)

( * ) Notice: Subject to any disclaimer, the term of this patent is extended or adjusted under 35 U.S.C. 154(b) by 200 days.

(21) Appl. No.: 13/508,822

(22) PCT Filed: Nov. 5, 2010

(86) PCT No.: PCT/JP2010/069662
§ 371 (c)(1),
(2), (4) Date: May 9, 2012

(87) PCT Pub. No.: WO2011/058922
PCT Pub. Date: May 19, 2011

(65) Prior Publication Data
US 2012/0269998 A1    Oct. 25, 2012

(30) Foreign Application Priority Data
Nov. 13, 2009    (JP) .................................. 2009-259659

(51) Int. Cl.
*B32B 3/26*    (2006.01)
*B21D 13/10*    (2006.01)
(Continued)

(52) U.S. Cl.
CPC ................ *B21D 13/10* (2013.01); *B21D 47/00* (2013.01); *B32B 1/08* (2013.01); *B32B 3/26* (2013.01);
(Continued)

(58) Field of Classification Search
CPC .... B29D 99/0021; B21D 13/10; B21D 47/00; B32B 3/26; B32B 3/28; B32B 3/30; B32B 1/08; B32B 2605/08; Y10T 428/13; Y10T 428/24628; Y10T 428/1241; Y10T 428/12993; Y10T 428/24678; Y10T 428/24702

USPC .......... 428/593, 172, 35.7, 59, 174, 66.5, 93, 428/57, 58, 598, 687, 595, 603, 604, 187
See application file for complete search history.

(56) References Cited

U.S. PATENT DOCUMENTS 1,074,824 A    10/1913    Wadsworth
D71,046 S    9/1926    Boyd
(Continued)

FOREIGN PATENT DOCUMENTS

DE    3900166 A1    7/1990
EP    1251216 A2    10/2002
(Continued)

OTHER PUBLICATIONS

International Search Report from parent application No. PCT/JP2010/069662.
(Continued)

*Primary Examiner* — Yan Lan
(74) *Attorney, Agent, or Firm* — J-Tek Law PLLC; Jeffrey D. Tekanic; Scott T. Wakeman

(57) ABSTRACT

Within an area of substantially regular hexagons arranged at regular intervals on an imaginary reference plane, a sheet material includes a concave-convex section (20) having a basic pattern in which one first region (A1) is surrounded by six second regions (A2). This basic pattern repeats in regular intervals in lateral and longitudinal directions of the sheet material. The concave-convex section includes first protruding portions (21) and second protruding portion (22), which protrude in opposite directions from each other in the thickness direction in the first regions and the second regions, respectively. The first and second protruding portions may have a hexagonal pyramidal shape or a truncated hexagonal pyramidal shape.

20 Claims, 15 Drawing Sheets

(51) Int. Cl.
  *B21D 47/00* (2006.01)
  *B32B 1/08* (2006.01)
  *B32B 3/28* (2006.01)
  *B32B 3/30* (2006.01)

(52) U.S. Cl.
  CPC ... *B32B 3/28* (2013.01); *B32B 3/30* (2013.01); B32B 2605/08 (2013.01); Y10T 428/13 (2015.01); Y10T 428/24628 (2015.01)

(56) References Cited

U.S. PATENT DOCUMENTS

| | | | |
|---|---|---|---|
| 1,957,654 A | 5/1934 | La Brie | |
| 2,380,447 A | 7/1945 | Jungersen | |
| 2,481,046 A | 9/1949 | Scurlock | |
| D173,158 S | 10/1954 | Johnson | |
| 2,699,599 A | 1/1955 | Potchen | |
| D178,569 S | 8/1956 | Hutchinson | |
| 2,858,247 A | 10/1958 | De Swart | |
| D188,648 S | 8/1960 | Cohen et al. | |
| 2,954,838 A | 10/1960 | Nuorivaara | |
| D190,068 S | 4/1961 | Vernon | |
| 3,011,602 A | 12/1961 | Ensrud et al. | |
| 3,096,032 A | 7/1963 | Davis | |
| 3,118,523 A | 1/1964 | Girot | |
| 3,302,359 A | 2/1967 | Alleaume | |
| 3,362,118 A | 1/1968 | Brunner | |
| 3,407,788 A | 10/1968 | Hagmann | |
| 4,146,666 A | 3/1979 | Houtlosser | |
| 4,411,121 A * | 10/1983 | Blacklin et al. | 52/789.1 |
| 4,588,258 A | 5/1986 | Hoopman | |
| 4,672,780 A | 6/1987 | Lockwood | |
| D313,512 S | 1/1991 | Legare | |
| 5,122,902 A | 6/1992 | Benson | |
| 5,292,027 A | 3/1994 | Lueke | |
| 5,399,406 A | 3/1995 | Matsuo et al. | |
| 5,612,117 A | 3/1997 | Belanger et al. | |
| 5,889,615 A | 3/1999 | Dreyer et al. | |
| 6,120,280 A | 9/2000 | Mimura et al. | |
| 6,136,416 A | 10/2000 | Smith et al. | |
| 6,383,607 B1 | 5/2002 | Shin | |
| 6,824,856 B2 | 11/2004 | Jones | |
| D625,110 S | 10/2010 | Koenig | |
| D647,704 S | 11/2011 | Missoni | |
| D659,404 S | 5/2012 | Hoernisch | |
| D662,325 S | 6/2012 | Wong et al. | |
| 8,293,072 B2 | 10/2012 | Super et al. | |
| D671,752 S | 12/2012 | Anderson et al. | |
| D671,753 S | 12/2012 | Anderson et al. | |
| 8,328,985 B2 | 12/2012 | Edwards et al. | |
| D673,779 S | 1/2013 | Takahashi | |
| 2007/0015000 A1 * | 1/2007 | Burdon | 428/593 |
| 2007/0184144 A1 | 8/2007 | Akishev et al. | |
| 2009/0013633 A1 | 1/2009 | Aubuchon | |
| 2011/0206891 A1 | 8/2011 | Eguchi et al. | |
| 2011/0262719 A1 | 10/2011 | Pringle et al. | |
| 2012/0160434 A1 | 6/2012 | Murray et al. | |
| 2012/0177939 A1 | 7/2012 | Longepied et al. | |
| 2012/0273027 A1 | 11/2012 | Convery | |

FOREIGN PATENT DOCUMENTS

| | | | |
|---|---|---|---|
| ES | 2156720 A1 | | 7/2001 |
| JP | 9-254955 | | 9/1997 |
| JP | 10-166481 | | 6/1998 |
| JP | 11-501587 | | 2/1999 |
| JP | 2960402 B1 | | 7/1999 |
| JP | 2000-136720 | | 5/2000 |
| JP | 2000-257441 | | 9/2000 |
| JP | 2000-288643 | | 10/2000 |
| JP | 3332353 | | 7/2002 |
| JP | 2002-307117 | | 10/2002 |
| JP | 2002-307227 | | 10/2002 |
| JP | 2002-321018 | | 11/2002 |
| JP | 2003-261070 | | 9/2003 |
| JP | 2004-26120 | | 1/2004 |
| JP | 2004-106022 | | 4/2004 |
| JP | 2004-218232 | | 8/2004 |
| JP | 2005-232751 | | 9/2005 |
| JP | 2006-137029 | | 6/2006 |
| JP | 2006-305999 | | 11/2006 |
| JP | 2007-23661 | | 2/2007 |
| JP | 2007-55143 | | 3/2007 |
| JP | 2007-112356 | | 5/2007 |
| JP | 2007301865 A | | 11/2007 |
| JP | 2008-180125 | | 8/2008 |
| JP | 4388558 | | 10/2009 |
| JP | 2009-257342 | | 11/2009 |
| JP | 2011-27248 | | 2/2011 |
| JP | 2011-101893 | | 5/2011 |
| JP | 2011-110847 | | 6/2011 |
| JP | 2011-147950 | | 8/2011 |
| JP | 2011-156581 | | 8/2011 |
| JP | 2011-202350 | | 10/2011 |
| JP | 2011-230174 | | 11/2011 |
| JP | 2012-30261 | | 2/2012 |
| WO | WO96/28625 | * | 9/1996 |
| WO | 03/056111 | | 7/2003 |
| WO | 2005058521 A | | 6/2005 |
| WO | 2007/010868 | | 1/2007 |
| WO | 2012/008059 | | 1/2012 |
| WO | 2012/032814 | | 3/2012 |

OTHER PUBLICATIONS

International Preliminary Report on Patentability from parent application No. PCT/JP2010/069662.
Un-published U.S. Appl. No. 13/809,502.
US unpublished U.S. Appl. No. 13/820,980.
Non-final Office Action mailed Apr. 23, 2014 in related U.S. Appl. No. 13/979,188.
Communication mailed Dec. 10, 2013 from the European patent application in counterpart EP application No. 10854741, including European Search Opinion, Supplementary European Search Report and examined claims 1-13.
Non-final Office Action mailed Apr. 1, 2014 in related U.S. Appl. No. 13/809,502.
Non-final Office Action mailed Feb. 12, 2014 in related U.S. Appl. No. 13/993,492.
Non-final Office Action mailed Apr. 22, 2014 in related U.S. Appl. No. 13/979,106.
Extended European Search Report dated May 21, 2015, and examined European claims.

* cited by examiner

SHEET MATERIAL HAVING CONCAVE-CONVEX SECTION, AND LAMINATED STRUCTURE AND VEHICLE PANEL USING THE SAME

CROSS-REFERENCE

This application is the US national stage of International Patent Application No. PCT/JP2010/069662 filed on Nov. 5, 2010 which claims priority to Japanese Patent Application No. 2009-259659, filed on Nov. 13, 2009.

TECHNICAL FIELD

The present invention relates to a sheet material having stiffness increased by forming a concave-convex section, and a laminated structure and a vehicle panel which use the same.

BACKGROUND ART

For the purpose of weight savings in automobiles, it has been considered and carried out, e.g., to replace the material of a component comprised by a steel sheet or the like with a light material, such as an aluminum alloy sheet. In this case, it is necessary to ensure the required stiffness as a prerequisite of the weight savings.

In order to increase the stiffness of a sheet material without increasing the thickness of the sheet, it has been considered to increase the stiffness in a geometric manner by providing a concave-convex pattern in the sheet material.

For example, one component of an automobile is a component formed by a sheet material known as a heat insulator. In Patent Document 1 a material is proposed that has a large number of convex portions formed thereon through embossing in order to ensure sufficient stiffness without increasing thickness. Moreover, in addition to the heat insulator, sheet materials having stiffness increased by forming a concave-convex section through embossing or the like have been proposed for various applications (Patent Documents 2 to 6).

PRIOR ART DOCUMENTS

Patent Documents

Patent Document 1: Japanese Patent Application Publication No. 2000-136720
Patent Document 2: Japanese Patent Application Publication No. 2000-257441
Patent Document 3: Japanese Patent Application Publication No. Hei 9-254955
Patent Document 4: Japanese Patent Application Publication No. 2000-288643
Patent Document 5: Japanese Patent Application Publication No. 2002-307117
Patent Document 6: Japanese Patent Application Publication No. 2002-321018

DISCLOSURE OF THE INVENTION

In Patent Document 1 it is true that a sheet material formed with a large number of concave-convex sections actually has higher stiffness than a sheet material having no concave-convex section. However, the optimum concave-convex shape for increasing stiffness without increasing thickness was not elucidated. And, it is always required to further increase the stiffness increase ratio.

In addition to automobiles, it is also required to reduce the weight of components formed by a sheet material as much as possible in a variety of machinery equipment, etc. Besides the need for weight reductions, it is also expected to result in material cost reductions. Furthermore, if it is a sheet material (a material having the shape of a plate), there is a demand for increased stiffness, regardless of the type of the material.

Moreover, there is also a demand to utilize a sheet material having a concave-convex section with a high stiffness increasing effect for a laminated structure and a vehicle panel, which include the sheet material, and various other applications.

The present invention has been made in view of these problems and has an object to provide a sheet material having stiffness increased by forming a concave-convex section, i.e. a sheet material having a pattern of a concave-convex section that has a higher stiffness increasing effect than has been conventional, and to provide a laminated structure and a vehicle panel that use this sheet material.

A first aspect of the present invention is a sheet material having stiffness increased by forming a concave-convex section, wherein, within an area of substantially regular hexagons arranged at regular intervals on an imaginary reference plane, the concave-convex section has a basic pattern in which one first region is surrounded by six second regions and the basic pattern repeats in regular intervals in lateral and longitudinal directions on the plane, and the concave-convex section has a shape that provides first protruding portions and second protruding portions, which protrude in opposite directions from each other in the thickness direction in the first regions and the second regions, respectively, the first protruding portions have a hexagonal pyramidal shape or a truncated hexagonal pyramidal shape, which protrude on one side in the thickness direction with an outer contour line of the first region on the reference plane serving as a base portion, and the second protruding portions have a hexagonal pyramidal shape or a truncated hexagonal pyramidal shape, which protrude on the other side in the thickness direction with an outer contour line of the second region on the reference plane serving as a base portion.

A second aspect of the present invention is a laminated structure formed by laminating a plurality of sheet materials, wherein the laminated structure is characterized by at least one of the sheet materials being the sheet material having the concave-convex section of the first aspect.

A third aspect of the present invention is a vehicle panel having an outer panel and an inner panel joined to a back face of the outer panel, wherein either or both of the outer panel and the inner panel is/are constituted by the sheet material having the concave-convex section of the first aspect.

The concave-convex section of the sheet material having the concave-convex section includes the first protruding portions and the second protruding portions, which protrude in opposite directions to each other from the reference plane as described above, and they are arranged in regular intervals as described above. By basing the concave-convex structure on hexagons, it is possible to obtain very high stiffness in every direction.

Therefore, even if the sheet material having the concave-convex section is directly used as a sheet member, it is possible to obtain a component having lower weight and higher stiffness than has been conventional. Moreover, a joining together with other components is very effective. In addition, it is possible to obtain a dampening increasing effect with increased stiffness and a sound echo suppressing effect through the concave-convex shape.

According to the second aspect, because the sheet material including the concave-convex section having the excellent stiffness is provided in a part of the laminated structure, it is possible to easily obtain the laminated structure having very high stiffness and excellent energy absorbing properties. Moreover, it is possible to obtain a dampening increasing effect with increased stiffness and a sound absorbing increasing effect by incorporating an air space layer.

According to the third aspect, by using the sheet material including the concave-convex section having the high stiffness for either or both of the outer panel and the inner panel as described above, it is possible to easily obtain a vehicle panel which has very high stiffness and excels in energy absorbing properties. Moreover, it is possible to obtain a dampening increasing effect with increased stiffness and a sound absorption increasing effect by incorporating an air space layer.

MODES FOR CARRYING OUT THE INVENTION

Figure 1:
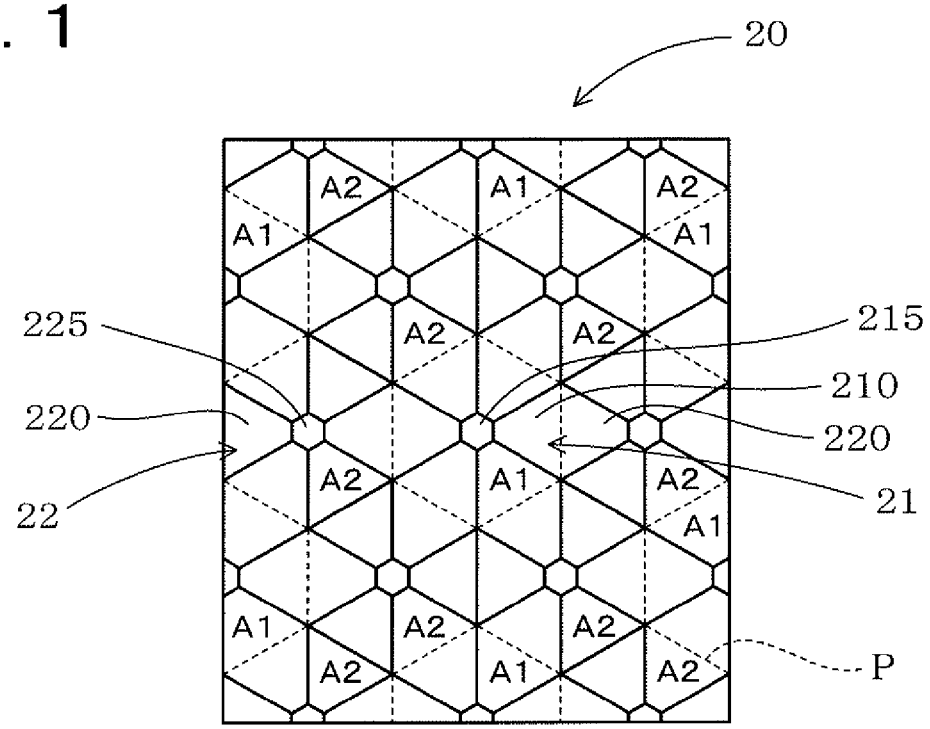
FIG. 1 is a plan view showing a portion of a concave-convex section according to a first embodiment.

A sheet material having the above-mentioned concave-convex section can be formed by performing plastic deformation, such as press forming or roll forming, if it is a metal sheet having plasticity, and can be formed by injection molding, hot pressing or the like if it is a resin material or the like. In case a steel sheet, a titanium sheet, an aluminum alloy sheet or the like is used as the metal sheet, it is desirable to carry out the shaping using the below-described dimensions and shapes.

It is preferable that an inclination angle of side surfaces of the first protruding portions relative to a reference plane should be in the range of 10° to 60° and an inclination angle of side surfaces of the second protruding portions relative to the reference plane should be in the range of 10° to 60°.

Although the inclination angle relative to the reference plane can be represented by two angles obtained by bisecting 180°, in the present description the inclination angle means the acute angle. It will be the same below.

If the inclination angle of the side surfaces of the first protruding portions is less than 10°, there is a problem that the stiffness increasing effect cannot be sufficiently obtained by the inclination. On the other hand, if the inclination angle of the side surfaces of the first protruding portions exceeds 60°, there is a problem that the shaping becomes difficult.

Moreover, if the inclination angle of the side surfaces of the second protruding portions is less than 10°, there is a problem that the stiffness increasing effect cannot be sufficiently obtained by the inclination. On the other hand, if the inclination angle of the side surfaces of the second protruding portions exceeds 60°, there is a problem that the shaping becomes difficult.

Furthermore, the inclination angle of the side surfaces of the first protruding portions relative to the reference plane and the inclination angle of the side surfaces of the second protruding portions relative to the reference plane preferably should be equal to each other, and the side surfaces of the first protruding portion positioned in the center of the basic pattern and the side surfaces of the second protruding portions, which are peripherally adjacent to the first protruding portion, should be evenly and continuously formed without having a bent part at the reference plane.

In this case, the effect of improved shaping ability can be obtained.

Further, the inclination angle of the side surfaces of the first protruding portions relative to the reference plane may be different than the inclination angle of the side surfaces of the second protruding portions relative to the reference plane, and the side surfaces of the first protruding portion positioned in the center of the basic pattern and the side surfaces of the second protruding portions, which are peripherally adjacent to the first protruding portion, may be connected by a bent portion at the reference plane.

In this case, for example, if the sheet material having the concave-convex section is used as a shock absorber, it is possible to obtain the effect of controlling the impact absorption distribution that the first protruding portions and the second protruding portions will absorb.

Moreover, at least one of the first protruding portions and the second protruding portions may have a hexagonal pyramidal shape or a truncated hexagonal pyramidal shape with a plurality of steps having a step portion that changes the inclination angle in an intermediate portion thereof.

In this case, an effect can be obtained in which the shaping can be performed to make a shape that maximizes the stiffness within the shapeable range. Also, incase the hexagonal pyramidal shape with the uneven steps or the truncated hexagonal pyramidal shape with the uneven steps is employed, it is preferable that the inclination angle of the side surfaces should be in the range of 10° to 60° at every position for the same reason as described above.

Moreover, the thickness t before the formation of the concave-convex section preferably should be 0.05 mm to 3.0 mm. By setting the thickness t within this range, it is possible to obtain exceptional stiffness while ensuring manufacturability. On the other hand, if the thickness t is less than 0.05 mm, it is difficult to obtain the required stiffness for the application, and if the thickness t exceeds 3.0 mm, the shaping becomes difficult. The reason for defining the thickness t before the shaping of the concave-convex section is that the concave-convex section is processed by plastic deformation, such as press or roll forming, so that the thickness of each portion will vary in some cases.

Moreover, the ratio ($D_1/t$) of an outer dimension $D_1$ (mm) of a base portion of the first protruding portions to the thickness t preferably should be 10 to 2000 and the ratio ($D_2/t$) of an outer dimension $D_2$ (mm) of a base portion of the second protruding portions to the thickness t (mm) preferably should be 10 to 2000. The outer dimensions $D_1$ and $D_2$ are the diameters of circumscribed circles of the external contours of the respective base portions.

In case the ratio ($D_1/t$) is less than 10, there might be a problem that the shaping becomes difficult; on the other hand, in case the ratio ($D_1/t$) exceeds 2000, there might be a problem that the stiffness decreases because the hexagonal pyramid or the truncated hexagonal pyramid can not be shaped sufficiently.

Moreover, in case the ratio ($D_2/t$) is less than 10, there might be a problem that the shaping becomes difficult; on the other hand, in case the ratio ($D_2/t$) exceeds 2000, there might be a problem that the stiffness decreases because the hexagonal pyramid or the truncated hexagonal pyramid can not be shaped sufficiently.

Furthermore, the ratio ($H_1/t$) of the protruding height $H_1$ (mm) of the first protruding portions to the thickness t (mm) preferably should satisfy $1 \leq (H_1/t) \leq -4\theta_1 + 242$ in relation to the largest inclination angle $\theta_1(°)$ on the side surfaces of the first protruding portions; the ratio ($H_2/t$) of the protruding height $H_2$ (mm) of the second protruding portions to the thickness t (mm) preferably should satisfy $1 \leq (H_2/t) \leq -4\theta_2 + 242$ in relation to the largest inclination angle $\theta_2(°)$ on the side surfaces of the second protruding portions. It is assumed that the protruding heights $H_1$ and $H_2$ are measured from the location of the reference plane to the location of the thickness center of the peak portion.

In case the ratio ($H_1/t$) is less than 1 there might be a problem that the stiffness increasing effect can not be sufficiently obtained by the shaping of the first protruding portions; on the other hand, in case the ratio ($H_1/t$) exceeds $-4\theta_1 + 242$, there might be a problem that the shaping becomes difficult.

Further, in case the ratio ($H_2/t$) is less than 1 there might be a problem that the stiffness increasing effect can not be sufficiently obtained by the shaping of the first protruding portions; on the other hand, in case the ratio ($H_2/t$) exceeds $-4\theta_2 + 242$, there might be a problem that the shaping becomes difficult.

Further, the laminated structure of the second aspect may be in the form of a two-layered laminated structure that is formed by the above-described sheet material having the concave-convex section serving as a one-sheet core material and one sheet of a flat plate being disposed on one surface of the core material, or it may be in the form of a three-layered laminated structure that is formed by the above-described sheet material having the concave-convex section serving as a one-sheet core material and one sheet of a flat plate being disposed on both surfaces of the core material. Furthermore, a multi-layered structure can be obtained by repeating such a basic structure, that is, by laminating a plurality of sheet materials having the concave-convex section with flat plates being respectively interposed therebetween.

In addition, it is also possible to make a structure by directly laminating a plurality of sheet materials having the concave-convex section to form a core material and by joining a flat plate to one surface or to both surfaces of the core material.

Moreover, it is also possible to make a laminated structure in a state that only a plurality of the sheet materials having the concave-convex section are directly laminated together.

The number of laminations of the above-described sheet materials can be varied depending on the application and the required properties.

Embodiments (First Embodiment)

A sheet material 1 having a concave-convex section according to an embodiment of the present invention will be described with reference to FIGS. 1 to 6.

The sheet material 1 having a concave-convex section 20 according to the present embodiment is a sheet material having stiffness increased by forming the concave-convex section 20 as shown in FIGS. 1 to 6. The sheet material 1 is a 1000 series aluminum sheet having a thickness t=0.9 mm before the formation of the concave-convex section 20.

The concave-convex section 20 is formed by press forming using a pair of dies. For the shaping method, it is also possible to employ other plastic deformation methods, such as roll forming, for performing the shaping by using a pair of shaping rolls having the desired concave-convex shape on the surfaces thereof. The concave-convex section 20 is comprised as follows.

Figure 2:
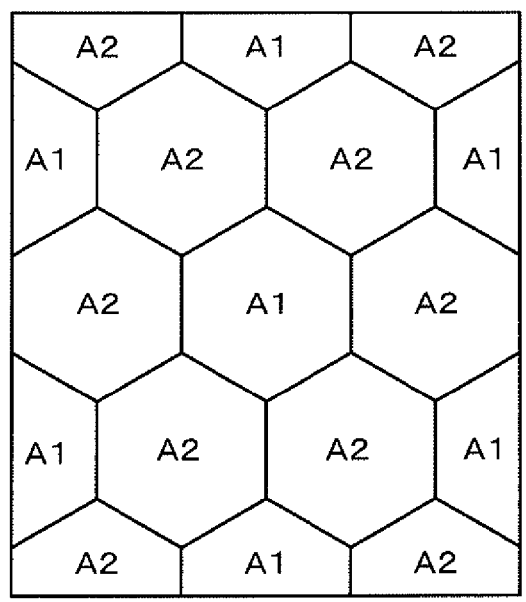
FIG. 2 is an explanatory view showing the pattern of first regions and second regions in the concave-convex section corresponding to FIG. 1 according to the first embodiment.

FIG. 1 is a plan view showing a portion of the concave-convex section 20. In the same Figure, portions, which are contours of a first region A1 and a second region A2 but are not visible as visible outlines, are shown in dotted lines P (FIG. 3, FIGS. 7 to 10, and FIG. 12 which will be described below are also the same). In FIG. 2, only the contours of the first regions Al and the second regions A2 are shown in solid lines for the area that corresponds to FIG. 1. As can be seen from these drawings, within an area of regular hexagons arranged at regular intervals on an imaginary reference plane, the concave-convex section 20 has a basic pattern in which one first region A1 is surrounded by six second regions A2 and this basic pattern continues at regular intervals in the lateral and longitudinal directions of the plane. In all of the drawings, the thickness and other dimensions are emphasized for the convenience of explanation and are not precise.

Figure 3:
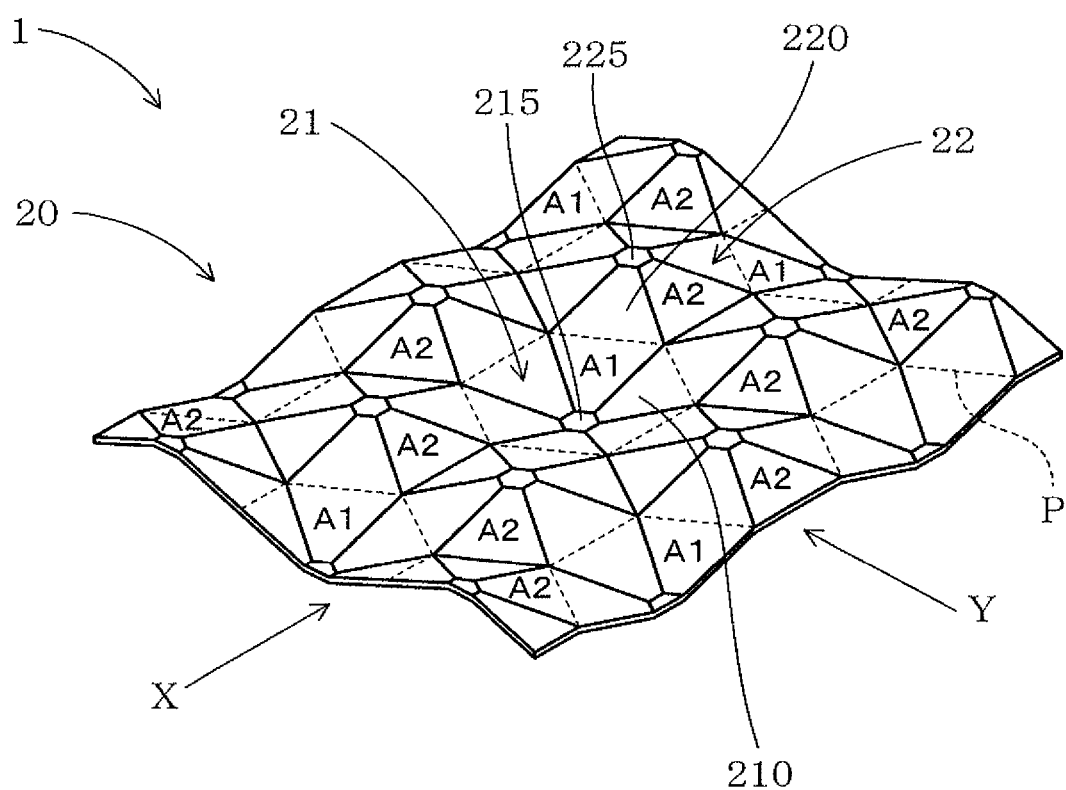
FIG. 3 is a perspective view showing a portion of the concave-convex section according to the first embodiment.
Figure 4:
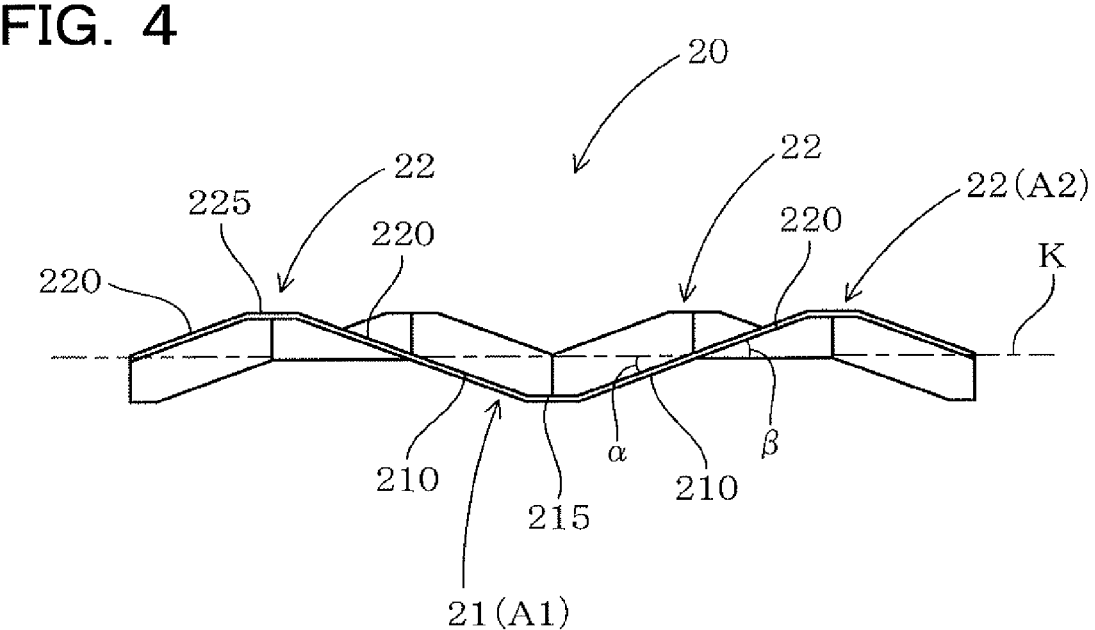
FIG. 4 is a side view as viewed in the direction of arrow X in FIG. 3 according to the first embodiment.
Figure 5:
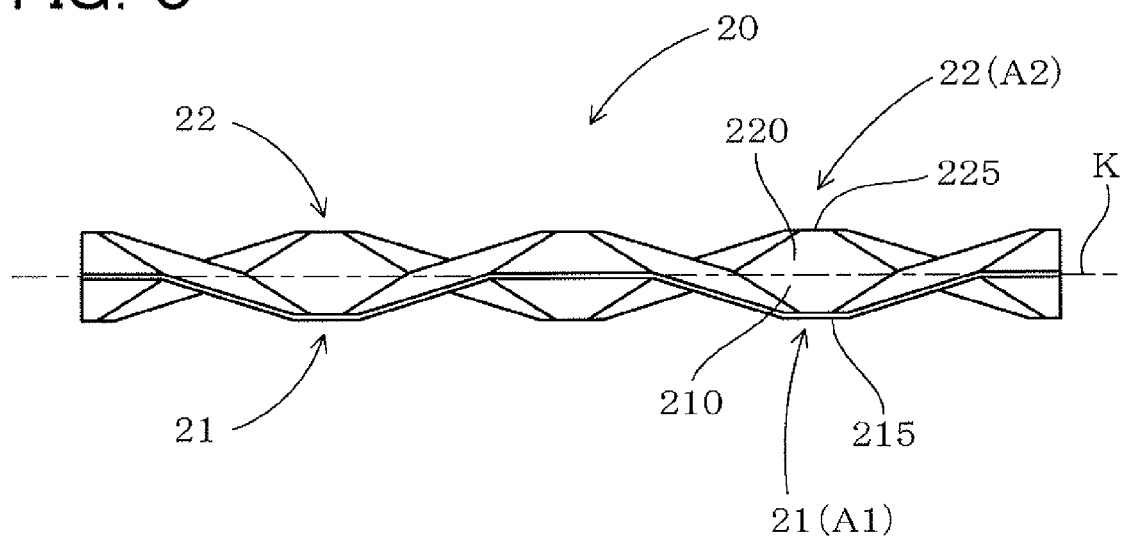
FIG. 5 is a side view as viewed in the direction of arrow Y in FIG. 3 according to the first embodiment.

As shown in FIGS. 3 to 5, the concave-convex section 20 has a shape that provides first protruding portions 21 and second protruding portions 22, which protrude in opposite directions in the thickness direction in the first regions A1 and the second regions A2, respectively.

As shown in FIGS. 3 to 5, the first protruding portions 21 have a truncated hexagonal pyramidal shape that protrudes towards one side in the thickness direction with the outer contour line of the first regions A1 on the reference plane serving as a base portion, and include flat first flat surfaces 215 on the peak portions thereof. The second protruding portions 22 have a truncated hexagonal pyramidal shape that protrudes towards the other side in the thickness direction with the outer contour line of the second regions A2 on the reference plane serving as a base portion, and include flat second flat surfaces 225 on the peak portions thereof.

As shown in FIG. 4, in the present embodiment, the inclination angle α of the side surfaces 210 of the first protruding portions 21 relative to the reference plane K and the inclination angle β of the side surfaces 220 of the second protruding portions 22 relative to the reference plane K are both set to be 20°. Therefore, as shown in FIGS. 3, 4 and 5, the side surfaces 210 of the first protruding portion 21 positioned in the center of the basic pattern and the side surfaces 220 of the second protruding portions 22, which are peripherally adjacent to the first protruding portion 21, are formed continuously in a single plane without having a bent portion at the reference plane.

Figure 6:
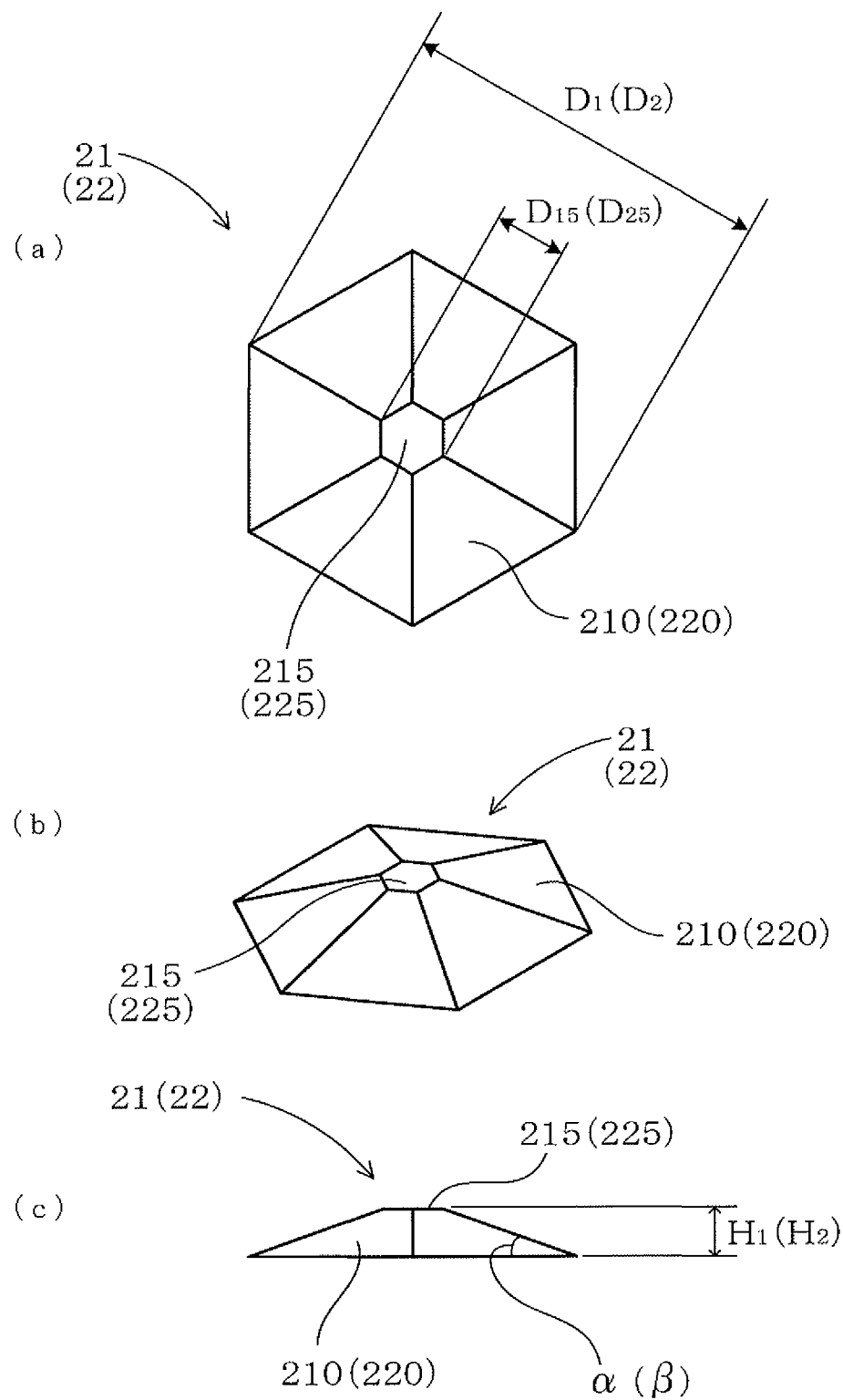
FIGS. 6(a), 6(b) and 6(c) are plan, perspective and front views, respectively, showing the shape of a single first protruding portion (second protruding portion) according to the first embodiment.

In the present embodiment, moreover, the first protruding portions 21 and the second protruding portions 22 have identical shapes and equal dimensions and have different protruding directions from each other. FIG. 6 is a view showing only a single first protruding portion 21 (second protruding portion 22). FIG. 6(a) is a plan view, FIG. 6(b) is a perspective view and FIG. 6(c) is a front view.

As shown in the same Figure (a), both the outer dimension $D_1$ of the base portion of the first protruding portion 21 and the outer dimension $D_2$ of the base portion of the second protruding portion 22 are equally set to be 116 mm. Accordingly, both the ratio ($D_1/t$) of the outer dimension $D_1$ to the thickness t and the ratio ($D_2/t$) of the outer dimension $D_2$ to the thickness t are 129 and are within the range of 10 to 2000. Both of the outer dimensions $D_1$ and $D_2$ represent the diameters of circumscribed circles of the external contours of the respective base portions.

As shown in the same Figure (c), both the protruding height $H_1$ of the first protruding portion 21 and the protruding height $H_2$ of the second protruding portion 22 are equally set to be 15 mm. Accordingly, both the ratio ($H_1/t$) of the protruding height $H_1$ to the thickness t (mm) and the ratio ($H_2/t$) of the protruding height $H_2$ to the thickness t (mm) are 16.7. Moreover, the largest inclination angle in the side surfaces 210 of the first protruding portion 21 is set to be $\theta_1=\alpha=20°$ and the largest inclination angle in the side surfaces 220 of the second protruding portion 22 is set to be $\theta_2=\beta=20°$. Therefore, both $-4\theta_1+242$ and $-4\theta_2+242$ are 162. Thus, the relationship of $1 \leq (H_1/t) \leq 162$ and the relationship of $1 \leq (H_2/t) \leq 162$ are satisfied.

Both the first flat surfaces 215 and the second flat surfaces 225 of the regular hexagonal shapes in the peak portions of the first protruding portions 21 and the second protruding portions 22 are set to have relatively small areas, and the outer dimensions $D_{15}$ and $D_{25}$ thereof are set to be 18% of the above-described $D_1$ and $D_2$.

A sheet material 1 having the concave-convex section 20 of such a configuration exhibits exceptional, high stiffness properties.

(FEM Analysis 1)

In order to quantitatively ascertain the stiffness increasing effect of the sheet material 1 having the concave-convex section 20 according to the present embodiment, an analysis using FEM (finite element method) was performed.

Figure 7:
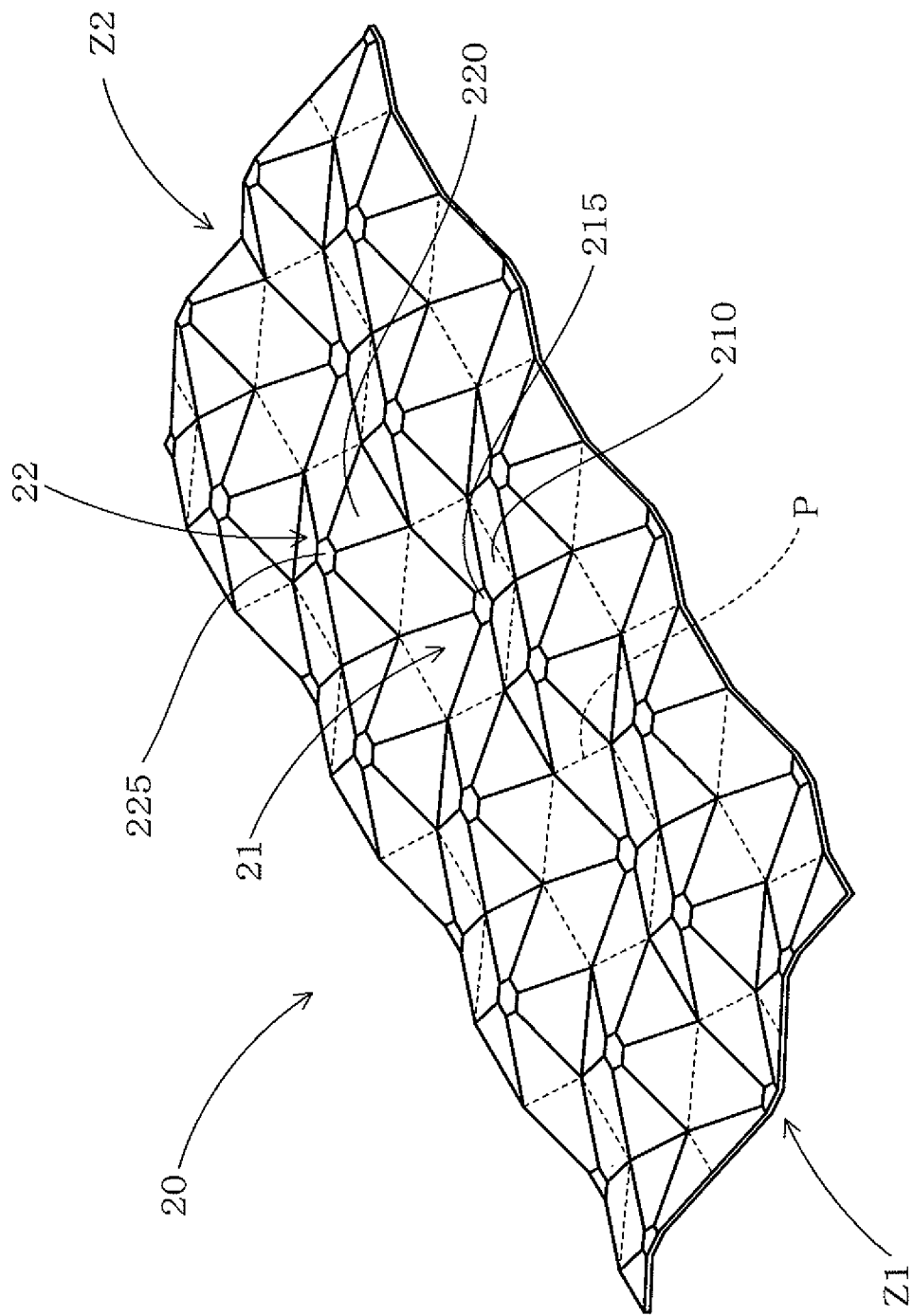
FIG. 7 is an explanatory view showing the size of the concave-convex section to be used for an FEM analysis according to the first embodiment.

The FEM analysis supposes a cantilever such that one end Z1 of a test piece formed with only the concave-convex section 20 having the size shown in FIG. 7 is fixed and the other end Z2 is set to be a free end, and obtains the stiffness from the amount of deflection when a load of 1N is applied to the free end. The test piece had a size of 300 mm×606 mm and the thickness t before press forming the concave-convex section 20 was 0.9 mm; after press forming, the thickness t was 0.8 mm taking into account the thinning.

The evaluation of the stiffness was performed using the ratio of the amount of deflection, which was obtained by performing the same FEM analysis on an unprocessed sheet having a flat shape before the formation of the concave-convex section 20, and in view of how many times the stiffness was increased.

As a result of the FEM analysis, it was found that the concave-convex section 20 according to the present embodiment has a stiffness increased by 9.7 times as compared to the case of the flat sheet material.

Figure 8:
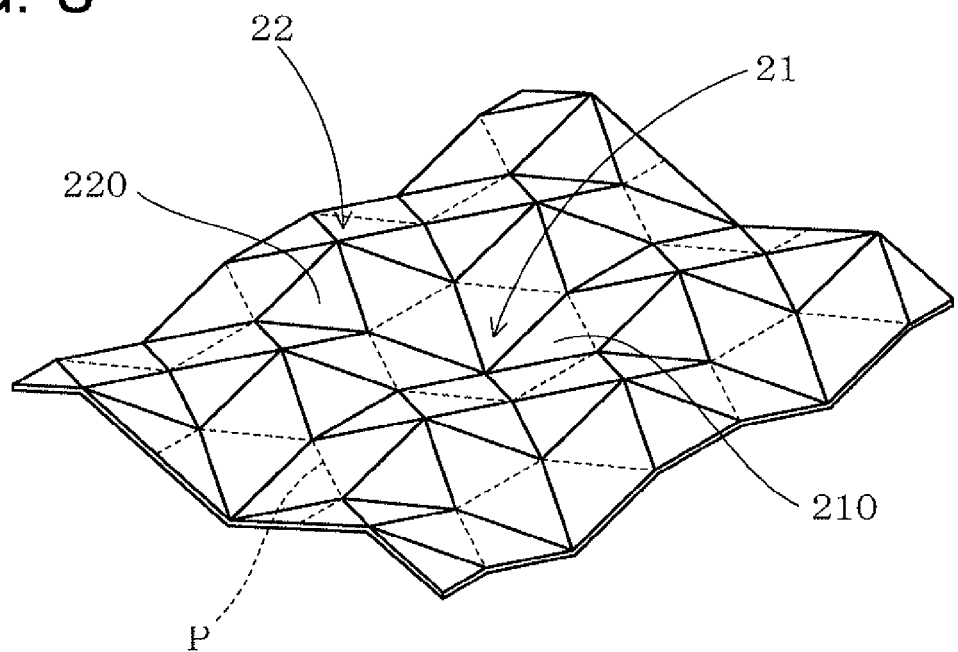
FIG. 8 is a perspective view showing a portion of another example of a concave-convex section according to the first embodiment that does not have a first flat surface and a second flat surface.

As shown in FIG. 8, it is also possible to employ a concave-convex section shape in which the first flat surfaces 215 according to the first embodiment were omitted, the first protruding portions 21 have a hexagonal pyramid shape, the second flat surfaces 225 were omitted and the second protruding portions 22 have a hexagonal pyramidal shape. Also in this case, roughly the same functions and effects can be obtained as the first embodiment.

(Second Embodiment)

Figure 9:
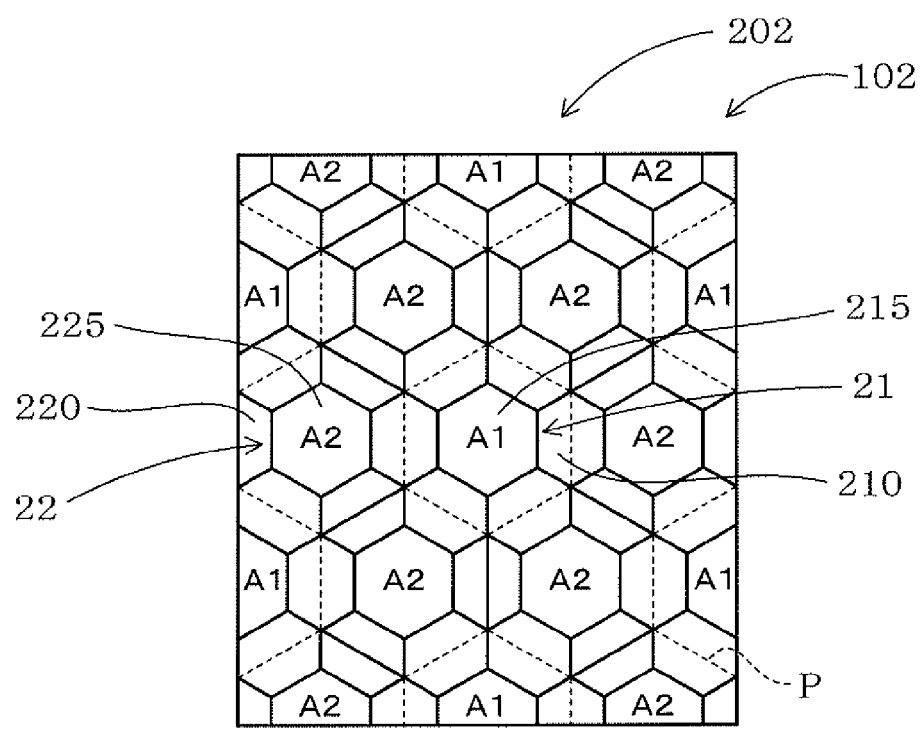
FIG. 9 is a plan view showing a portion of a concave-convex section according to a second embodiment.
Figure 10:
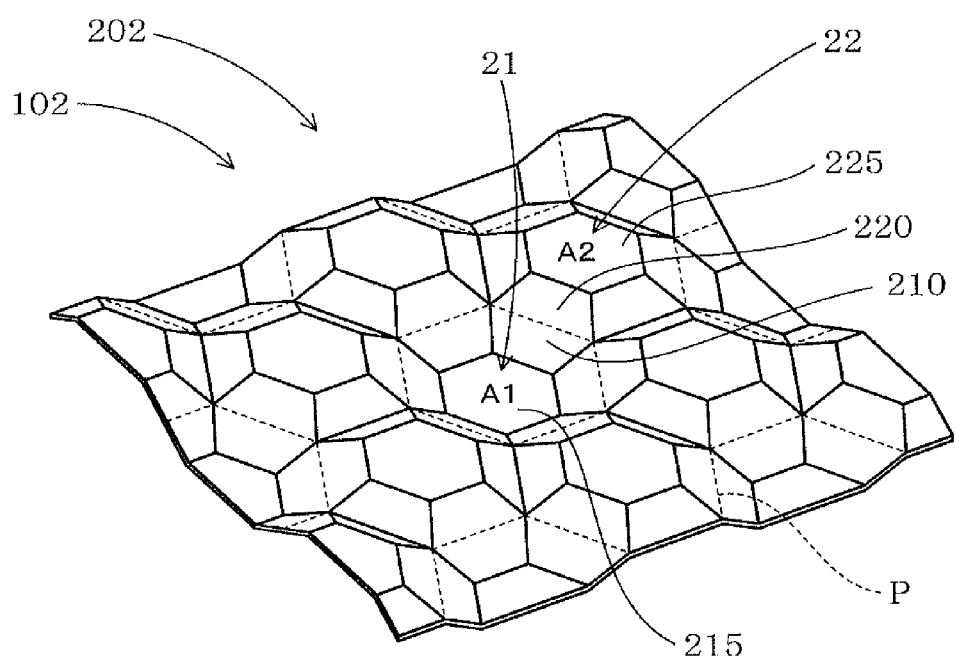
FIG. 10 is a perspective view showing a portion of the concave-convex section according to the second embodiment.
Figure 11:
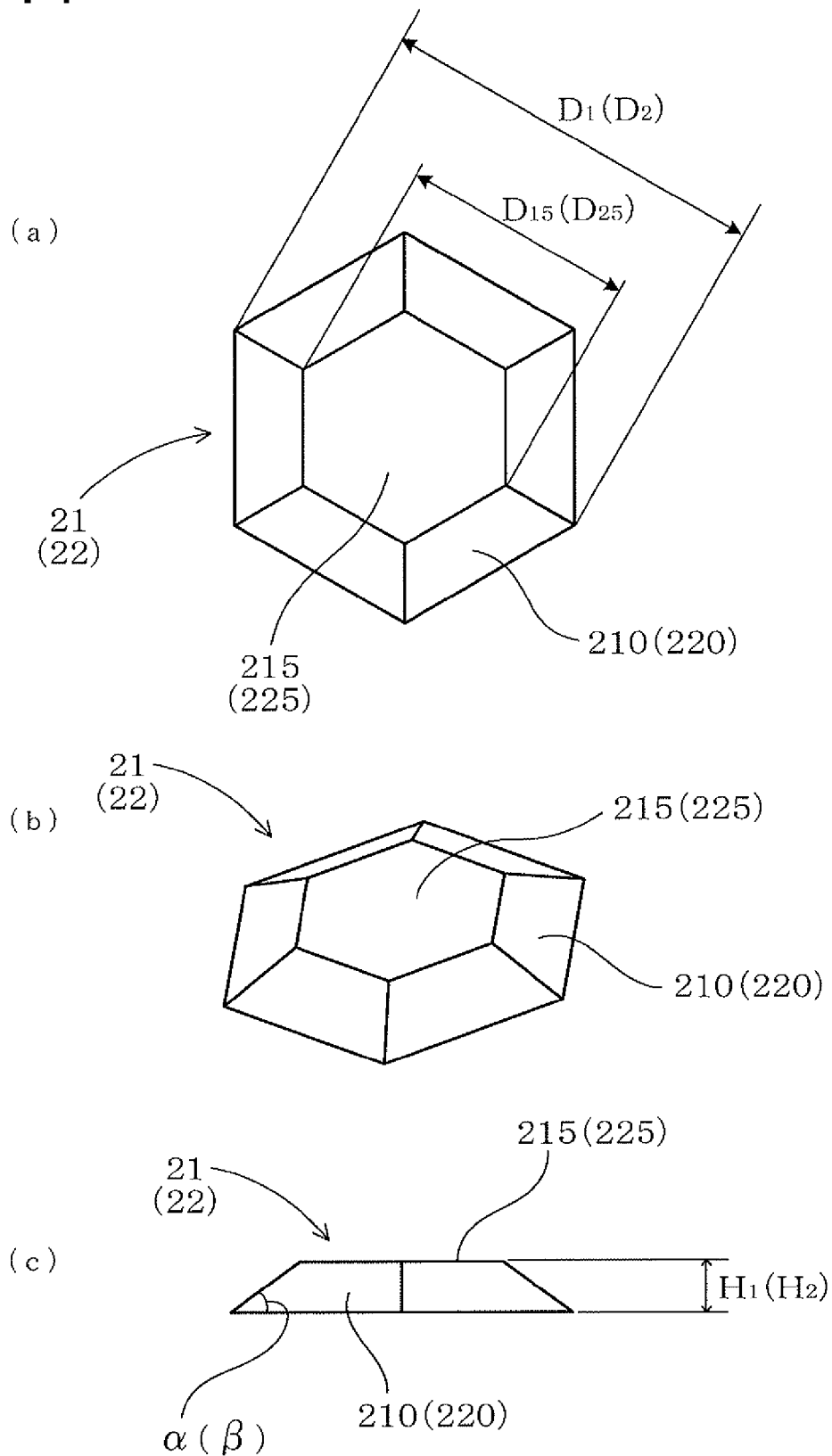
FIGS. 11(a), 11(b) and 11(c) are plan, perspective and front views, respectively, showing the shape of a single first protruding portion (second protruding portion) according to the second embodiment.

A sheet material 102 having a concave-convex section 202 of the present embodiment is based on the structure of the first embodiment in which the shape of the concave-convex section was modified as shown in FIGS. 9 to 11. The sheet material 102 is a 1000 series aluminum sheet having a thickness t=0.9 mm before the formation of the concave-convex section 202.

As shown in FIGS. 9 and 10, within an area of regular hexagons arranged at regular intervals on an imaginary reference plane, the concave-convex section 202 according to the present embodiment has a basic pattern in which one first region A1 is surrounded by six second regions A2 and the basic pattern repeats in regular intervals in the lateral and longitudinal directions on the plane. For convenience of explanation, the same portions as those in the first embodiment have the same reference numerals even if the shapes are different (it will be the same below).

As shown in the same Figures, the concave-convex section 202 has a shape that provides first protruding portions 21 and second protruding portions 22, which protrude in opposite directions in the thickness direction in the first regions A1 and the second regions A2, respectively.

In the same manner as was the case of the first embodiment, the first protruding portions 21 have a truncated hexagonal pyramidal shape that protrudes towards one side in the thickness direction with the outer contour line on the reference plane serving as a base portion of the first region A1, and include flat first flat surfaces 215 on the peak portions thereof. The second protruding portions 22 have a truncated hexagonal pyramidal shape that protrudes towards the other side in the thickness direction with the outer contour line on the reference plane serving as a base portion of the second regions A2, and include flat second flat surfaces 225 on the peak portions thereof.

The first protruding portions 21 and the second protruding portions 22 have identical shapes and equal dimensions and have different protruding directions from each other. FIG. 11 is a view showing only a single first protruding portion 21 (second protruding portion 22) according to the present embodiment. FIG. 11(a) is a plan view, FIG. 11(b) is a perspective view and FIG. 11(c) is a front view.

As shown in the same Figure (a), both the outer dimension $D_1$ of the base portion of the first protruding portion 21 and the outer dimension $D_2$ of the base portion of the second protruding portion 22 are equally set to be 116 mm. Accordingly, both the ratio ($D_1$/t) of the outer dimension $D_1$ to the thickness t (mm) and the ratio ($D_2$/t) of the outer dimension $D_2$ to the thickness t (mm) are 129 and are within the range of 10 to 2000. Both of the outer dimensions $D_1$ and $D_2$ represent the diameters of circumscribed circles of the external contours of the respective base portions.

As shown in the same Figure (c), both the protruding height $H_1$ of the first protruding portions 21 and the protruding height $H_2$ of the second protruding portions 22 are equally set to be 13 mm. Accordingly, both the ratio ($H_1$/t) of the protruding height $H_1$ to the thickness t (mm) and the ratio ($H_2$/t) of the protruding height $H_2$ to the thickness t (mm) are 14.4.

In addition, both the first flat surfaces 215 and the second flat surfaces 225 of the regular hexagonal shapes on the peak portions of the first protruding portions 21 and the second protruding portions 22 are set to have larger areas than was the case of the first embodiment, and the outer dimensions $D_{15}$ and $D_{25}$ thereof are set to be 55% of the above-described $D_1$ and $D_2$.

As shown in the same Figure (c), the inclination angle $\alpha$ of the side surfaces 210 of the first protruding portions 21 relative to the reference plane and the inclination angle $\beta$ of the side surfaces 220 of the second protruding portions 22 relative to the reference plane are both set to be 30°. Therefore, as shown in FIG. 10, the side surfaces 210 of the first protruding portion 21 positioned in the center of the basic pattern and the side surfaces 220 of the second protruding portions 22, which are peripherally adjacent to the first protruding portion 21, are formed continuously in a single plane without having a bent portion at the reference plane. In FIG. 10, the positions of boundary portions of the respective side surfaces 210 of the first protruding portion 21 and the side surfaces 220 of the second protruding portions 22 adjacent thereto (that is, the positions corresponding to the reference plane) are shown in dotted lines P.

Moreover, the largest inclination angle in the side surfaces 210 of the first protruding portions 21 is set to be $\theta_1=\alpha=30°$ and the largest inclination angle in the side surfaces 220 of the second protruding portions 22 is also set to be $\theta_2=\beta=30°$. Therefore, both of the values of $-4\theta_1+242$ and $-4\theta_2+242$ are 122. Thus, the above-described $H_1$/t) and ($H_2$/t) respectively satisfy the relationship of $1 \leq (H_1/t) \leq 122$ and the relationship of $1 \leq (H_2/t) \leq 122$.

(FEM Analysis 2)

In order to quantitatively ascertain the stiffness increasing effect of the sheet material 102 having the concave-convex section 202 according to the present embodiment, the same FEM analysis as in the first embodiment was carried out.

As a result of the FEM analysis, it was found that the concave-convex section 202 according to the present embodiment has a stiffness increased by 10.6 times as compared to the case of the flat sheet material.

(Third Embodiment)

Figure 12:
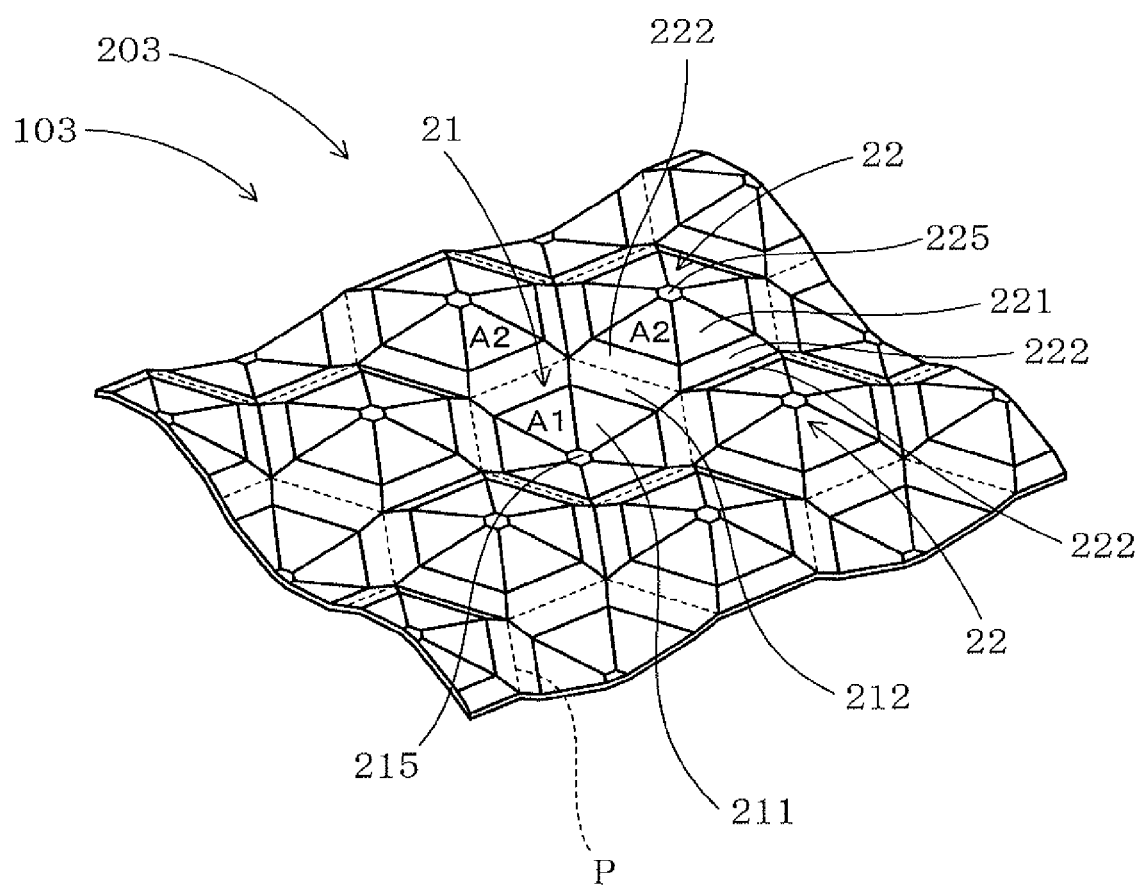
FIG. 12 is a perspective view showing a portion of a concave-convex section according to a third embodiment.
Figure 13:
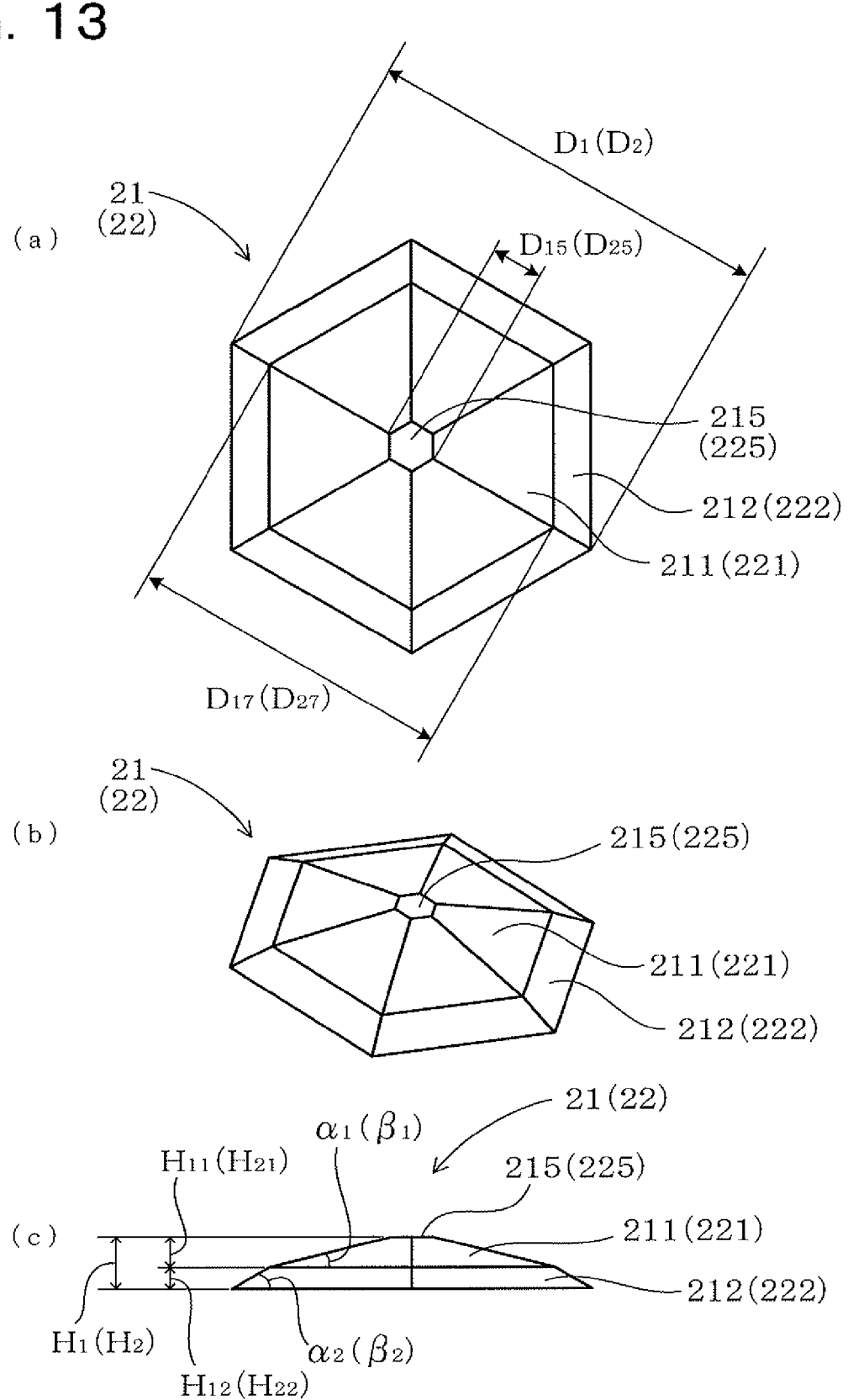
FIGS. 13(a), 13(b) and 13(c) are plan, perspective and front views, respectively, showing the shape of a single first protruding portion (second protruding portion) according to the third embodiment.

A sheet material 103 having a concave-convex section 203 according to the present embodiment is based on the structure of the first embodiment in which the shape of the concave-convex section was modified as shown in FIGS. 12 and 13. The sheet material 103 is a 1000 series aluminum sheet having a thickness t=0.9 mm before the formation of the concave-convex section.

As shown in FIG. 12, within an area of regular hexagons arranged at regular intervals on an imaginary reference plane, the concave-convex section 203 according to the present embodiment has a basic pattern in which one first region A1 is surrounded by six second regions A2 and the basic pattern repeats in regular intervals in the lateral and longitudinal directions on the plane.

As shown in the same Figure, the concave-convex section 203 has a shape that provides first protruding portions 21 and second protruding portions 22, which protrude in opposite directions in the thickness direction in the first regions A1 and the second regions A2, respectively.

In the present embodiment, the first protruding portions 21 and the second protruding portions 22 have a two-step truncated hexagonal pyramidal shape having step portions in which the inclination angle changes in an intermediate portion thereof. The peak portions thereof include flat first flat surfaces 215 and flat second flat surfaces 225.

The first protruding portions 21 and the second protruding portions 22 have identical shapes and equal dimensions and have different protruding directions from each other. FIG. 13 is a view showing only a single first protruding portion 21 (second protruding portion 22) according to the present embodiment. FIG. 13(a) is a plan view, FIG. 13(b) is a perspective view and FIG. 13(c) is a front view.

As shown in the same Figure (a), both the outer dimension $D_1$ of the base portion of the first protruding portion 21 and the outer dimension $D_2$ of the base portion of the second protruding portion 22 are equally set to be 116 mm. Accordingly, both the ratio ($D_1$/t) of the outer dimension $D_1$ to the thickness t (mm) and the ratio ($D_2$/t) of the outer dimension $D_2$ to the thickness t (mm) are 129 and are within the range of 10 to 2000. Both of the outer dimensions $D_1$ and $D_2$ represent the diameters of circumscribed circles of the external contours of the respective base portion.

Moreover, the side surfaces of the first protruding portion 21 are configured by connecting a side surface 211 and a side surface 212 which have different inclination angles. Similarly, the side surfaces of the second protruding portion 22 are configured by connecting a side surface 221 and a side surface 222 which have different inclination angles. As shown in FIGS. 12 and 13, the boundary portions between the side surfaces 211 and the side surfaces 212 and between the side surfaces 221 and the side surfaces 222 appear as a regular hexagonal shape as a whole by the visualization of the bent lines.

As shown in FIG. 13(c), the inclination angle $\alpha_1$ of the side surfaces 211, which are located closer to the peak side of the first protruding portion 21, relative to the reference plane and the inclination angle $\beta_1$ of the side surfaces 221, which are located closer to the peak side of the second protruding portion 22, relative to the reference plane are equally set to be 15°. Furthermore, the inclination angle $\alpha_2$ of the side surfaces 212, which are located closer to the base side of the first protruding portion 21, relative to the reference plane and the inclination angle $\beta_2$ of the side surfaces 222, which are located closer to the base side of the second protruding portion 22, relative to the reference plane are equally set to be 30°.

In case a truncated hexagonal pyramid having two steps is employed, as was described above, it is advantageous for the shaping that the inclination angles ($\alpha_1$, $\beta_1$) of the side surfaces, which are closer to the peak side, are set to be less than the inclination angles ($\alpha_2$, $\beta_2$) of the side surfaces, which are closer to the base side.

As was described above, the relationship between the inclination angles of the side surfaces of the first protruding portions 21 and the second protruding portions 22 is set to be identical. As shown in FIG. 12, therefore, the side surfaces 212 on the base side of the first protruding portion 21, which is positioned in the center of the basic pattern, and the side surfaces 222 on the base side of the second protruding portions 22, which are peripherally adjacent to the first protruding portion 21, are formed continuously in a single plane without having a bent portion at the reference plane. In FIG. 12, although the positions of the boundary portions between the side surfaces 212 of the first protruding portion 21 and the side surfaces 222 of the second protruding portion 22 adjacent thereto do not appear as actual outlines, they are shown in dotted lines P. As shown in the same Figure, at positions adjacent to neighboring second protruding portions 22, because they protrude in the identical direction in the thickness direction, naturally a bent outline is visible due to the side surfaces 222 intersecting each other at the reference plane.

As shown in FIG. 13(c), moreover, both the protruding height $H_1$ of the first protruding portions 21 and the protruding height $H_2$ of the second protruding portions 22 are equally set to be 15 mm. Accordingly, both the ratio ($H_1$/t) of the protruding height $H_1$ to the thickness t (mm) and the ratio ($H_2$/t) of the protruding height $H_2$ to the thickness t (mm) are 16.7. Moreover, the largest inclination angle in the side surfaces 210 of the first protruding portions 21 is set to be $\theta_1 = \alpha_2 = 30°$ and the largest inclination angle in the side surfaces 220 of the second protruding portions 22 is set to be $\theta_2 = \beta_2 = 30°$. Therefore, both $-4\theta_1 + 242$ and $-4\theta_2 + 242$ are 122. Thus, the relationship of $1 \leq (H_1/t) \leq 122$ and the relationship of $1 \leq (H_2/t) \leq 122$ are satisfied.

Although the first protruding portions 21 and the second protruding portions 22 have the above-described, two-step truncated hexagonal pyramidal shape in the present embodiment, the heights $H_{11}$ and $H_{21}$ of the upper step portions are set to be the same 9 mm and the heights $H_{12}$ and $H_{22}$ of the lower step portions are set to be the same 6 mm.

Further, the first flat surfaces 215 and the second flat surfaces 225 of the regular hexagonal shapes on the peak portions of the first protruding portions 21 and the second protruding portions 22 have the outer dimensions $D_{15}$ and $D_{25}$ set to 14 mm, which is 12% of the above-described $D_1$ and $D_2$; furthermore, the outer dimensions $D_{17}$ and $D_{27}$ of the base portion of the upper-tier truncated hexagonal pyramids are set to 92 mm.

(FEM Analysis 3)

In order to quantitatively ascertain the stiffness increasing effect of the sheet material 103 having the concave-convex section 203 according to the present embodiment, the same FEM analysis as in the first embodiment was carried out.

As a result of the FEM analysis, it was found that the concave-convex section 203 according to the present embodiment has a stiffness increased by 10.6 times as compared to the case of the flat sheet material.

(Fourth Embodiment)

Figure 14:
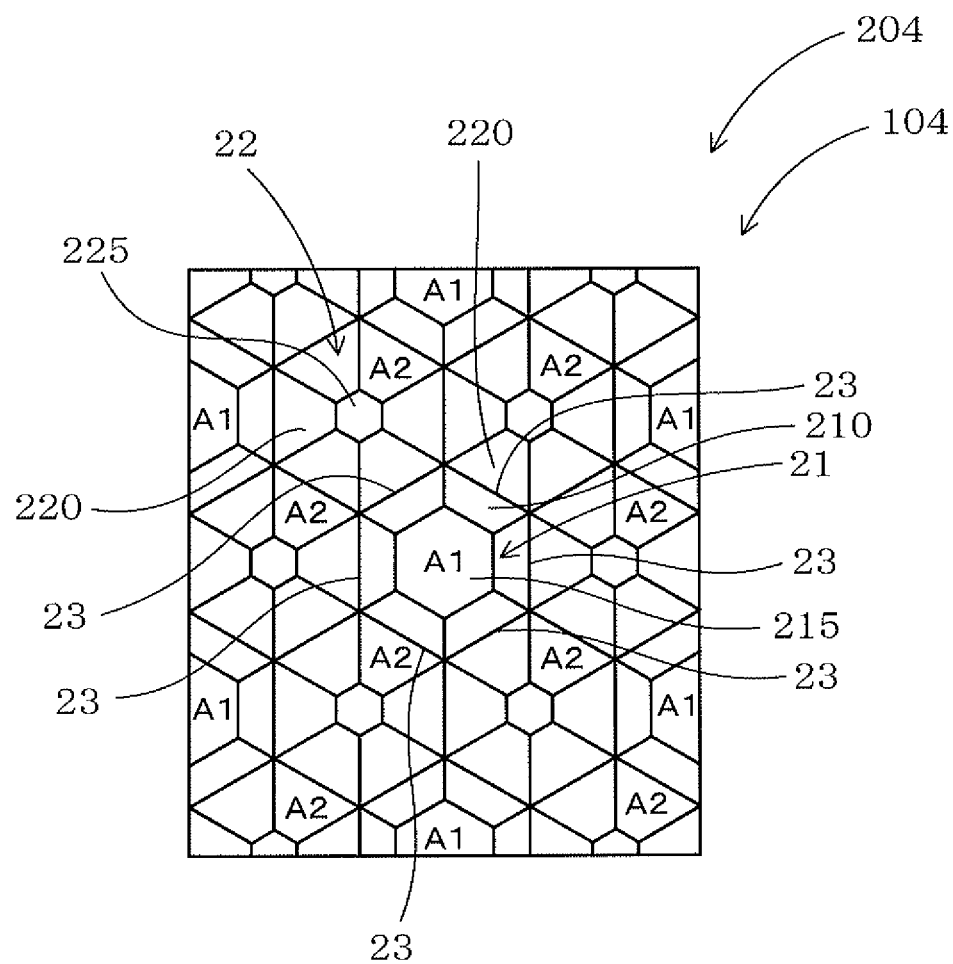
FIG. 14 is a plan view showing a portion of a concave-convex section according to a fourth embodiment.
Figure 15:
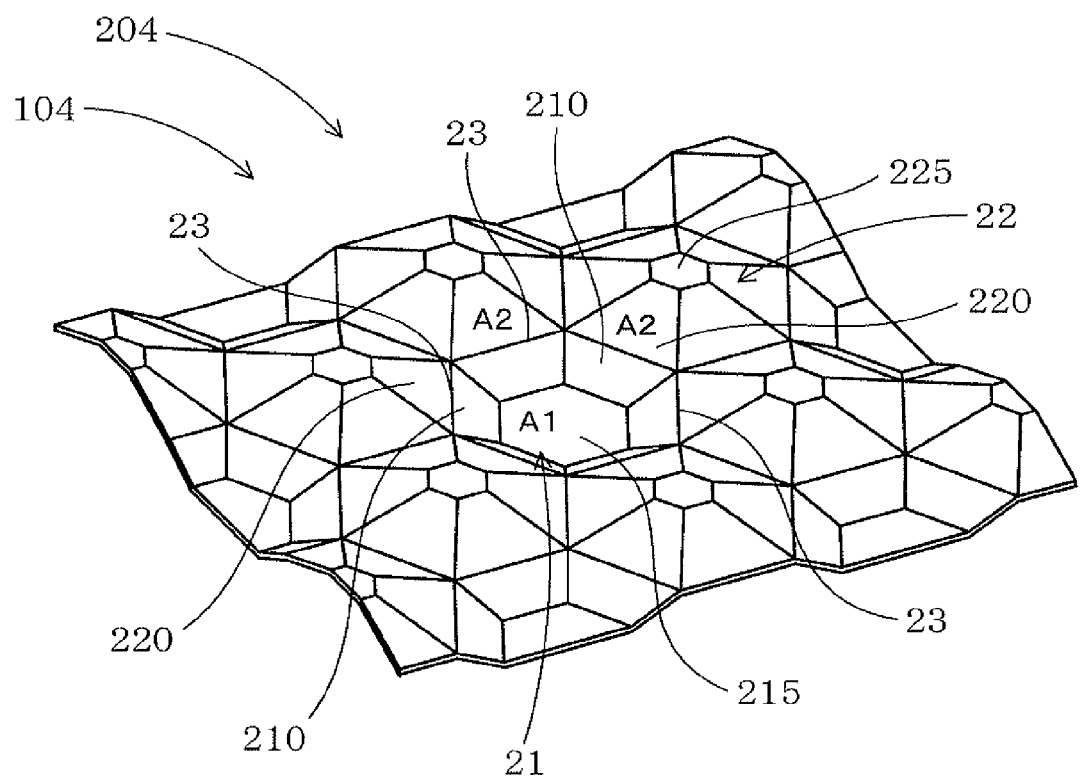
FIG. 15 is a perspective view showing a portion of the concave-convex section according to the fourth embodiment.

A sheet material 104 having a concave-convex section 204 of the present embodiment is based on the structure of the first embodiment in which the shape of the concave-convex section was modified as shown in FIGS. 14 and 15. The sheet material 104 is a 1000 series aluminum sheet having a thickness t=0.9 mm before the formation of the concave-convex section.

As shown in FIGS. 14 and 15, within an area of regular hexagons arranged at regular intervals on an imaginary reference plane, the concave-convex section 204 according to the present embodiment has a basic pattern in which one first region A1 is surrounded by six second regions A2 and the basic pattern repeats in regular intervals in the lateral and longitudinal directions on the plane.

As shown in FIG. 15, the concave-convex section 204 has a shape that provides first protruding portions 21 and second protruding portions 22, which protrude in opposite directions in the thickness direction in the first regions A1 and the second regions A2, respectively.

In the same manner as was the case of the first embodiment, the first protruding portions 21 have a truncated hexagonal pyramidal shape that protrudes towards one side in the thickness direction with the outer contour line of the first region A1 on the reference plane serving as a base portion, and include flat first flat surfaces 215 on the peak portions thereof. The second protruding portions 22 have a truncated hexagonal pyramidal shape that protrudes towards the other side in the thickness direction with the outer contour line of the second region A2 on the reference plane serving as a base portion, and include flat second flat surfaces 225 on the peak portions thereof.

As shown in FIGS. 14 and 15, although the first protruding portions 21 and the second protruding portions 22 according to the present embodiment have equal sizes of the regular hexagons, which represent the outer shapes of the regions, the shapes of the truncated hexagonal pyramids are different from each other. First of all, as shown in the same Figures, the first flat surface 215 of the peak portion of the first protruding portion 21 is set to have an area that is larger than the second flat surface 225 of the peak portion of the second protruding portion 22.

Second, the inclination angle α (not shown) of the side surfaces 210 of the first protruding portions 21 relative to the reference plane is set to be 25°, the inclination angle β (not shown) of the side surfaces 220 of the second protruding portions 22 relative to the reference plane is set to be 22°, and the inclination angle α of the side surfaces 210 of the first protruding portions 21 is set to be greater than the inclination angle β of the side surfaces 220 of the second protruding portion 22. Consequently, the side surfaces 210 of the first protruding portion 21 and the side surfaces of the second protruding portions 22, which are peripherally adjacent to the first protruding portion 21, are connected to each other through a bent portion 23 at the reference plane.

(FEM Analysis 4)

In order to quantitatively ascertain the stiffness increasing effect of the sheet material 104 having the concave-convex section 204 according to the present embodiment, the same FEM analysis as in the first embodiment was carried out.

As a result of the FEM analysis, it was found that the concave-convex section 204 according to the present embodiment has a stiffness increased by 9.7 times as compared to the case of the flat sheet material.

Although embodiments 2 to 4 utilized the flat truncated hexagonal pyramidal shape as the first protruding portions 21 and 22 for all of the peak portions, nearly the same functions and effects can be obtained even if the truncated hexagonal pyramidal shape is replaced with the hexagonal pyramidal shape in the same manner as the case of the other example according to the first embodiment shown in FIG. 8. The selection of one of the hexagonal pyramidal shape or the truncated hexagonal pyramidal shape is made depending on the application and the joining together with (an) other component(s).

Moreover, the aforementioned term used to describe the shape of the hexagonal pyramid, the truncated hexagonal pyramid, the square or the like is not restricted to geometrical concepts but includes those that can be recognized as such as shapes within the general concept, and also includes a shape in which a corner part, a side and a face are rounded and a curved surface known as a fillet R required for the shaping.

In each of the drawings used in this description, moreover, the thickness and other dimensions are emphasized for convenience of explanation and are different from precise dimensions.

(Fifth Embodiment)

Figure 16:
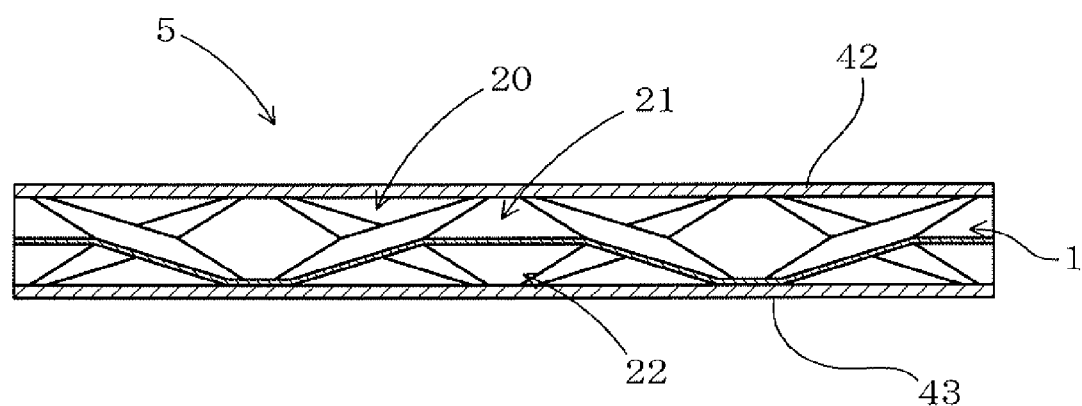
FIG. 16 is an explanatory view showing a cross-sectional shape of a laminated structure according to a fifth embodiment.
Figure 17:
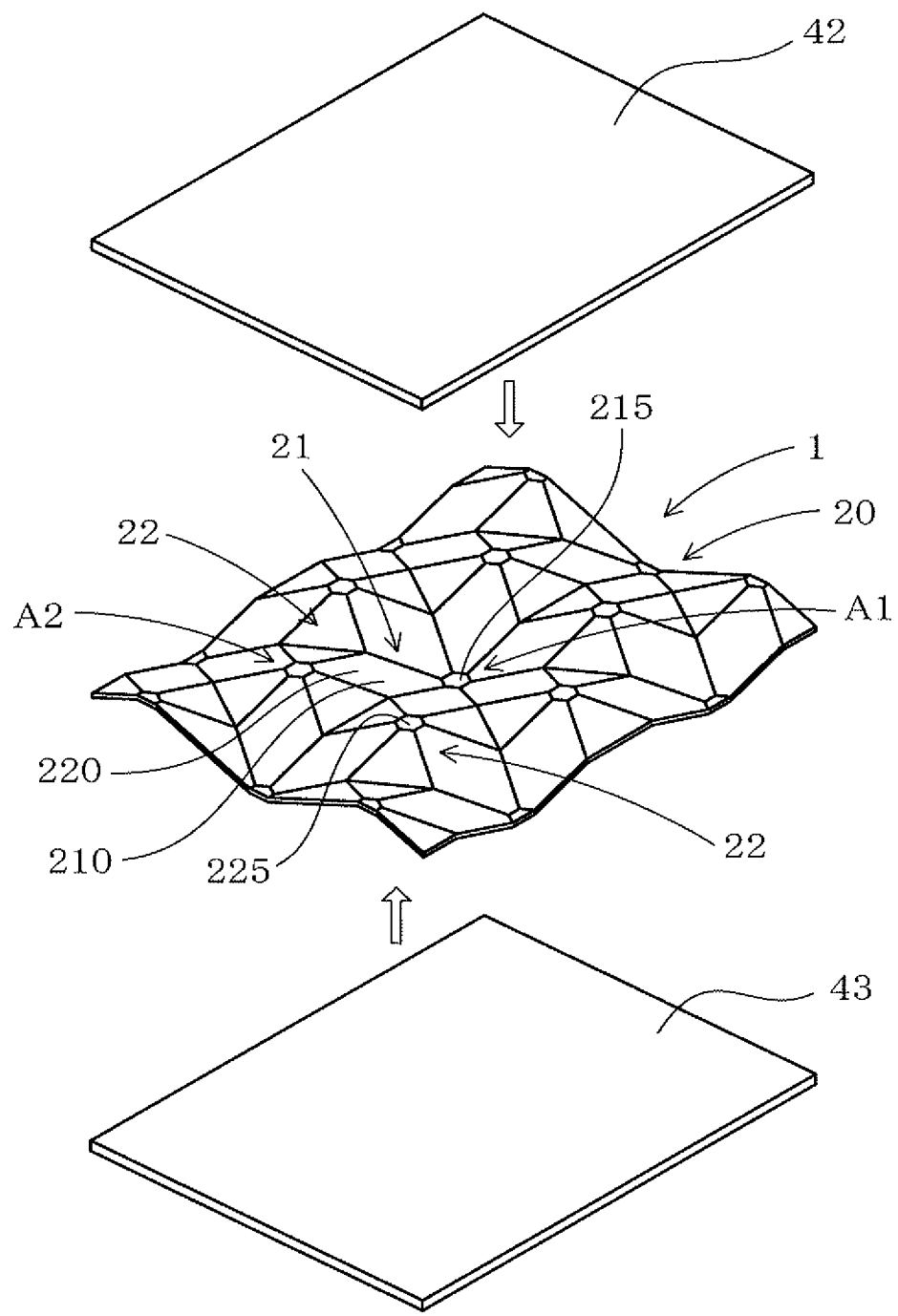
FIG. 17 is an exploded explanatory perspective view showing the laminated structure according to the fifth embodiment.

In the present embodiment, as shown in FIGS. 16 and 17, a laminated structure 5 is constituted by using the sheet material 1 having the concave-convex section 20 according to the first embodiment as a core material.

In other words, the laminated structure 5 is formed by joining face sheets 42 and 43 to the surfaces of both sides of the core material constituted by the single sheet material 1 having the concave-convex section 20 through adhesion, brazing or the like.

The face sheets 42 and 43 are constituted by a 3000 series aluminum alloy sheet having a thickness of 1.0 mm.

With respect to the laminated structure 5 according to the present embodiment, the sheet material 1 including the concave-convex section 20 having the excellent stiffness as described above is used as the core material to join the face sheets 42 and 43 to the first flat surfaces 215 of the first regions A1 and the second flat surfaces 225 of the second regions A2 through adhesion, brazing or the like. Consequently, a laminated structure 5 having a significantly higher stiffness can be obtained than in the case of a simple sheet material having the concave-convex section 20.

In addition, by forming both the sheet material 1 and the face sheets 42 and 43 from an aluminum alloy, weight reduction is possible.

In the laminated structure 5, moreover, it is possible to obtain a dampening increasing effect with the increased stiffness as well as a sound absorbing increasing effect by incorporating an air space layer. In addition, as is well known, by forming a through hole in one of the face sheets 42 and 43, a Helmholtz-type sound absorbing structure can be obtained, and furthermore, it is possible to increase the sound absorbing properties.

It is also possible to apply a sheet formed of a metal other than an aluminum alloy as the face sheet, for example, a steel sheet, a titanium sheet or the like, a resin sheet, or the like.

(Sixth Embodiment)

Figure 18:
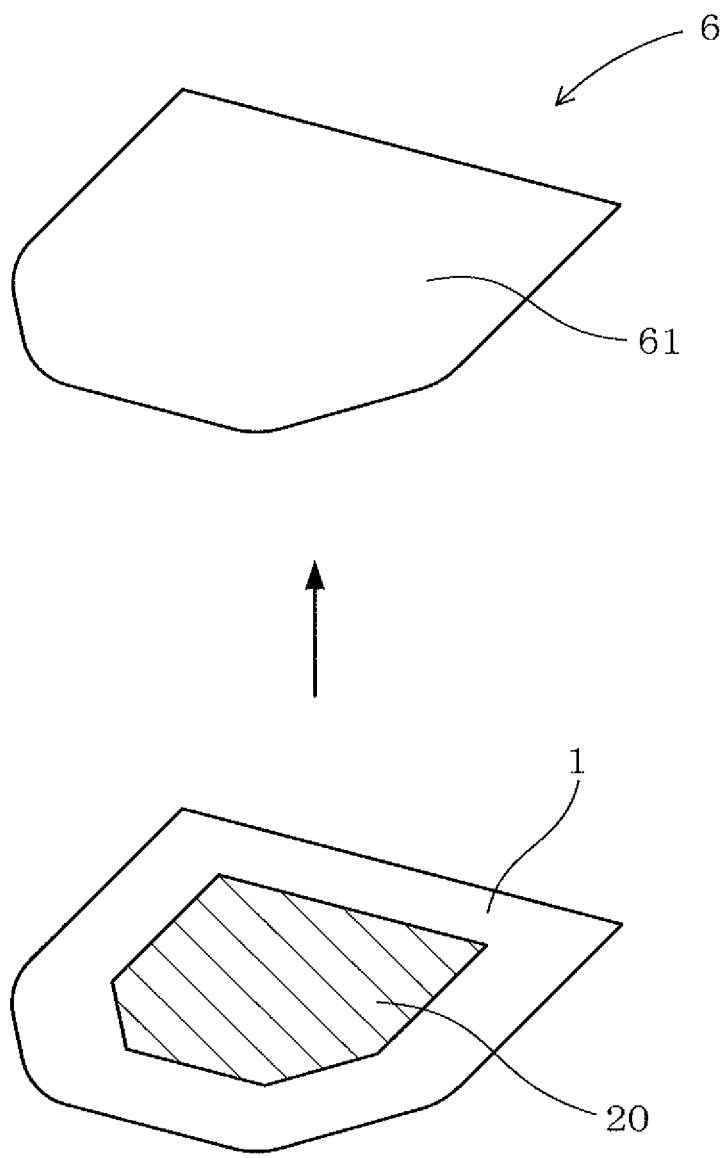
FIG. 18 is an exploded explanatory view showing a vehicle panel according to a sixth embodiment.

As shown in FIG. 18, the present embodiment is an example of a vehicle panel 6 constituted by using the sheet material 1 described in the first to fourth embodiments as an inner panel and disposing the first flat surfaces 215 of the first regions A1 so as to face the back side of an outer panel 61. The inner panel is joined to the outer panel 61 along an outer peripheral portion thereof through a hemming process or the like.

The vehicle panel 6 according to the present embodiment excels in the property of absorbing energy of a primary collision and energy of a secondary collision in the event of a collision with a pedestrian because it includes the sheet material 1 that has the concave-convex section 20 constituting the inner panel and excels in the stiffness increasing effect as described above. Moreover, it is possible to obtain a dampening increasing effect with increased stiffness and a sound absorbing increasing effect by incorporating an air space layer.

Although the sheet material 1 having the concave-convex section 20 is used as the inner panel in the present embodiment, it is possible to use either or both of the inner panel and the outer panel.

(Seventh Embodiment)

Figure 19:
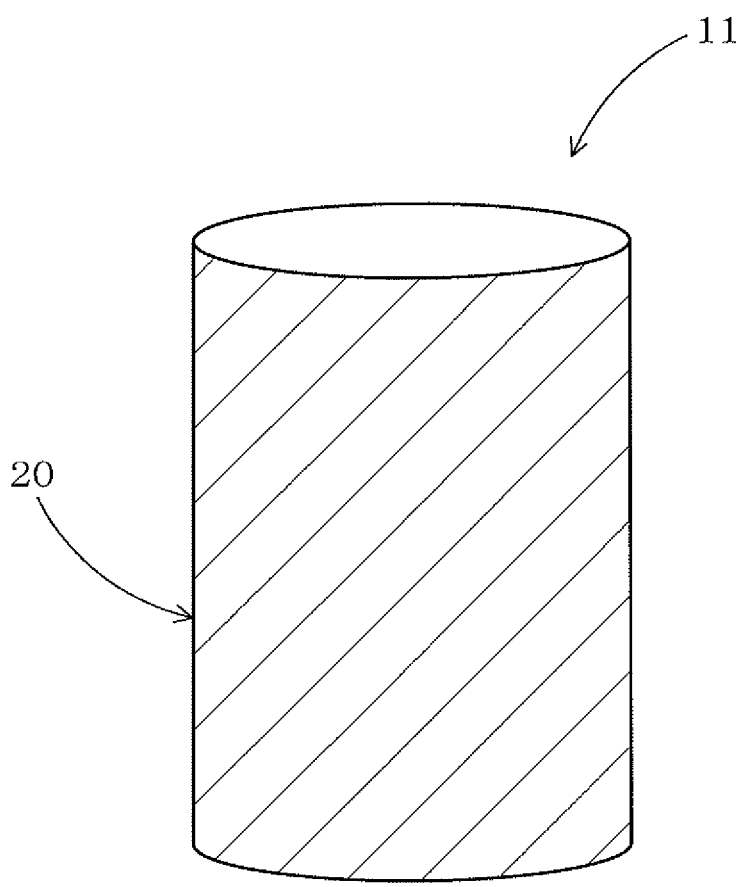
FIG. 19 is an explanatory view showing a sheet material having a cylindrical shape and having a concave-convex section according to a seventh embodiment.

As shown in FIG. 19, the present embodiment is an example that provides a concave-convex section 20 on a cylindrical material 11. In the present embodiment, the reference plane K is formed by a cylindrical curved surface. A unit shape of the concave-convex section 20 is made by conforming the shapes shown in the first to fourth embodiments to the curved surface formed by the reference plane K. The other structures are the same as those in the first to fourth embodiments.

As shown in the present embodiment, a sheet material 1 having the concave-convex section 20 which has high stiffness can be deformed into various shapes, thereby increasing its applications. In addition, it has the same functions and effects as the first to fourth embodiments.

By using the cylindrical material 11 having the concave-convex section 20 according to the present embodiment for a cylindrical structure such as a beverage can or a rocket, moreover, it is possible to increase stiffness without increasing the thickness of the material. Furthermore, the cylindrical material 11 according to the present embodiment has excellent energy absorbing properties. Therefore, by using the cylindrical material 11 in a component of an automobile or the like, it is possible to impart high stiffness and excellent energy absorbing properties thereto.

The invention claimed is:

1. A sheet material having a stiffness-increasing concave-convex section, wherein:
    within an area of substantially regular hexagons arranged at regular intervals on an imaginary reference plane, the concave-convex section has a basic pattern in which one first region directly borders six second regions and the basic pattern repeats at regular intervals in lateral and longitudinal directions of the plane,
    each first region is defined by a first protruding portion,
    each second region is defined by a second protruding portion,
    the first and second protruding portions protrude in opposite directions from each other in a thickness direction of the sheet material, the first protruding portions have a hexagonal pyramidal shape or a truncated hexagonal pyramidal shape, which protrudes on one side in the thickness direction and has an outer contour line on the imaginary reference plane that defines a base portion thereof, and
    the second protruding portions have a hexagonal pyramidal shape or a truncated hexagonal pyramidal shape, which protrudes on the other side in the thickness direction and has an outer contour line on the imaginary reference plane that defines a base portion thereof.

2. The sheet material according to claim 1, wherein an inclination angle of side surfaces of the first protruding portions relative to the imaginary reference plane is within the range of 10° to 60° and an inclination angle of side surfaces of the second protruding portions relative to the imaginary reference plane is within the range of 10° to 60°.

3. The sheet material according to claim 1, wherein the inclination angle of the side surfaces of the first protruding portions relative to the reference plane and the inclination angle of the side surfaces of the second protruding portions relative to the reference plane are equal to each other, and
    the side surfaces of the first protruding portion positioned in the center of the basic pattern and the side surfaces of the second protruding portions, which are peripherally adjacent to the first protruding portion, are evenly and continuously formed without having a bent part at the reference plane.

4. The sheet material according to claim 1, wherein the inclination angle of the side surfaces of the first protruding portions relative to the reference plane is different from the inclination angle of the side surfaces of the second protruding portions relative to the reference plane, and the side surfaces of the first protruding portion positioned in the center of the basic pattern and the side surfaces of the second protruding portions, which are peripherally adjacent to the first protruding portion, are joined by a bent part at the reference plane.

5. The sheet material according to claim 1, wherein at least one of the first protruding portions and the second protruding portions has the hexagonal pyramidal shape or the truncated hexagonal pyramidal shape with a plurality of steps defining a step portion that changes the inclination angle in an intermediate portion thereof.

6. The sheet material according to claim 2, wherein the sheet material has a thickness (t) of 0.05 mm to 3.0 mm before the concave-convex section is formed in the sheet material.

7. The sheet material according to claim 6, wherein a ratio $(D_1/t)$ of an outer dimension $(D_1)$ (mm) of the base portion of the first protruding portions to the thickness (t) (mm) is 10 to 2000 and a ratio $(D_2/t)$ of an outer dimension $(D_2)$ (mm) of the base portion of the second protruding portions to the thickness (t) (mm) is 10 to 2000.

8. The sheet material according to claim 6, wherein a ratio $(H_1/t)$ of a protruding height $(H_1)$ (mm) of the first protruding portions to the thickness (t) (mm) satisfies $1 \leq (H_1/t) \leq -4\theta_1 + 242$ in which $\theta_1(°)$ is the largest inclination angle on the side surfaces of the first protruding portions, and a ratio $(H_2/t)$ of a protruding height $(H_2)$ (mm) of the second protruding portions to the thickness (t) (mm) satisfies $1 \leq (H_2/t) \leq -4\theta_2 + 242$ in which $\theta_2(°)$ is the largest inclination angle on the side surfaces of the second protruding portions.

9. The sheet material according to claim 1, wherein a ratio $(D_1/t)$ of an outer dimension $(D_1)$ of the base portion of the first protruding portions to the thickness (t) of the sheet material is 10 to 2000 and a ratio $(D_2/t)$ of an outer dimension $(D_2)$ of the base portion of the second protruding portions to the thickness (t) of the sheet material is 10 to 2000.

10. The sheet material according to claim 9, wherein:
a ratio $(H_1/t)$ of a protruding height $(H_1)$ of the first protruding portions to the thickness (t) of the sheet material satisfies $1 \leq (H_1/t) \leq -4\theta_1 + 242$, wherein $\theta_1(°)$ is the largest inclination angle of the side surfaces of the first protruding portions, and
a ratio $(H_2/t)$ of a protruding height $(H_2)$ of the second protruding portions to the thickness (t) of the sheet material satisfies $1 \leq (H_2/t) \leq -4\theta_2 + 242$, wherein $\theta_2(°)$ is the largest inclination angle of the side surfaces of the second protruding portions.

11. The sheet material according to claim 10, wherein an inclination angle of side surfaces of the first protruding portions relative to the imaginary reference plane is within the range of 10° to 60° and an inclination angle of side surfaces of the second protruding portions relative to the imaginary reference plane is within the range of 10° to 60°.

12. The sheet material according to claim 11, wherein the thickness of the sheet material is between 0.05 mm and 3.0 mm before the concave-convex section is formed in the sheet material.

13. The sheet material according to claim 11, wherein the outer dimension $(D_1)$ of the base portion of the first protruding portions is equal to the outer dimension $(D_2)$ of the base portion of the second protruding portions.

14. The sheet material according to claim 13, wherein the protruding height $(H_1)$ of the first protruding portions is equal to the protruding height $(H_2)$ of the second protruding portions.

15. The sheet material according to claim 14, wherein the inclination angles $\theta_1(20)$ and $\theta_2(°)$ are 20°.

16. The sheet material according to claim 14, wherein the inclination angles $\theta_1(°)$ and $\theta_2(°)$ are 30°.

17. The sheet material according to claim 14, wherein the side surfaces of the first protruding portions and the side surfaces of the second protruding portions each comprise first and second portions joined at a bent part, the first portion having a smaller inclination angle relative to the imaginary reference plane than the second portion.

18. The sheet material according to claim 14, wherein sheet material has a cylindrical shape as a whole.

19. The sheet material according to claim 1, wherein the substantially regular hexagons form a tessellation on the imaginary reference plane.

20. A sheet material having a stiffness-increasing concave-convex section, wherein:
within an area of substantially regular hexagons arranged at regular intervals on an imaginary reference plane, the concave-convex section has a basic pattern in which one first region is surrounded by six second regions and the basic pattern repeats at regular intervals in lateral and longitudinal directions of the plane,
each first region is defined by a first protruding portion,
each second region is defined by a second protruding portion,
the first and second protruding portions protrude in opposite directions from each other in a thickness direction of the sheet material, the first protruding portions have a hexagonal pyramidal shape or a truncated hexagonal pyramidal shape, which protrudes on one side in the thickness direction and has an outer contour line on the imaginary reference plane that defines a base portion thereof, and
the second protruding portions have a hexagonal pyramidal shape or a truncated hexagonal pyramidal shape, which protrudes on the other side in the thickness direction and has an outer contour line on the imaginary reference plane that defines a base portion thereof, and
wherein the outer contour line of each of the first protruding portions has six and no more than six sides and the outer contour line of each of the second protruding portions has six and no more than six sides and wherein each of the six and no more than six sides of the outer contour line of one of the first protruding portions forms one of the six and no more than six sides of the six-sided outer contour lines of six of the second protruding portions.

* * * * *